Sept. 5, 1950
C. R. HAGEN
2,520,927
COTTON PICKING APPARATUS
Filed June 29, 1944
2 Sheets-Sheet 1
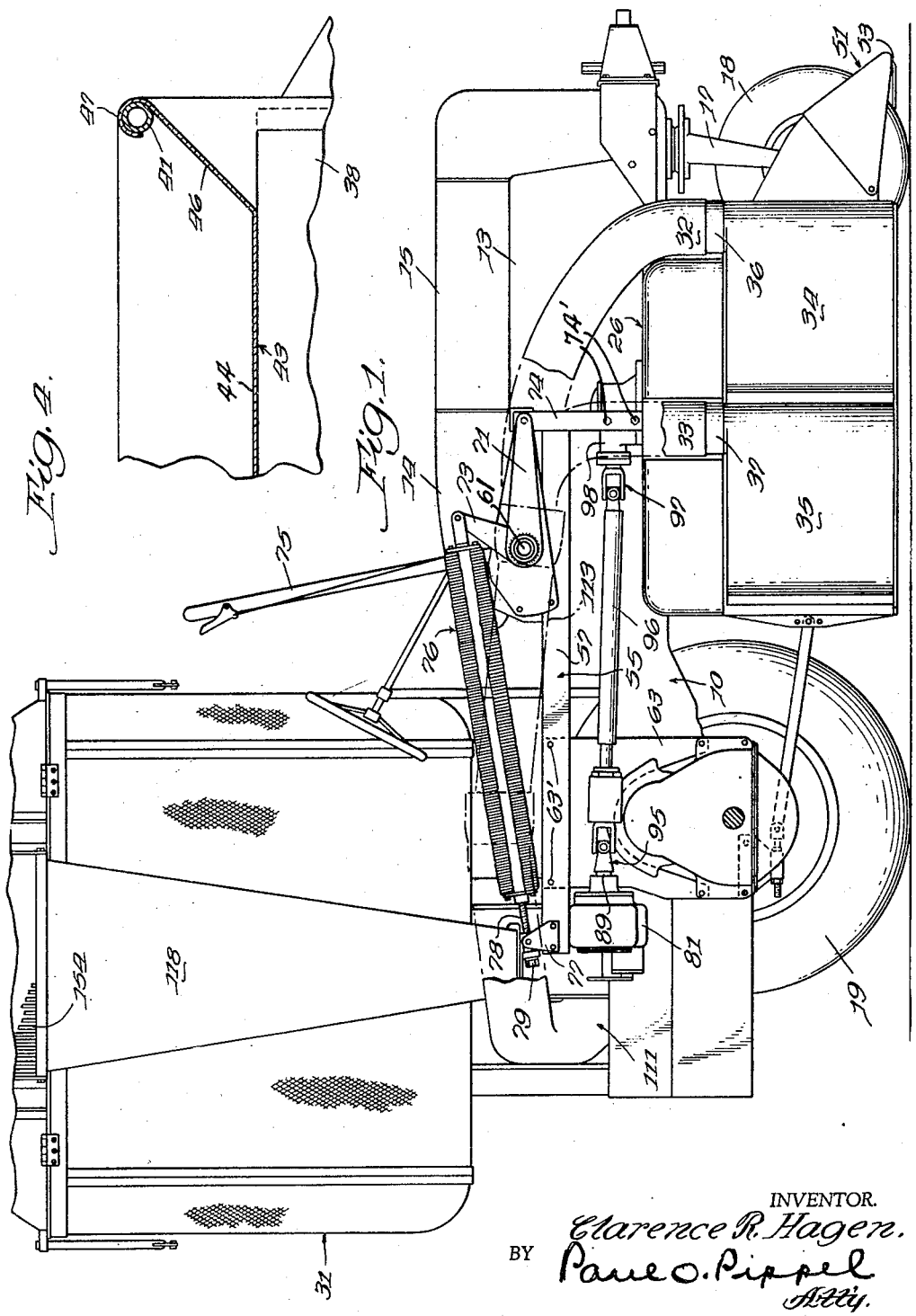
INVENTOR.
Clarence R. Hagen.
BY Paul O. Pippel
Atty.

Sept. 5, 1950
C. R. HAGEN
2,520,927
COTTON PICKING APPARATUS
Filed June 29, 1944
2 Sheets-Sheet 2
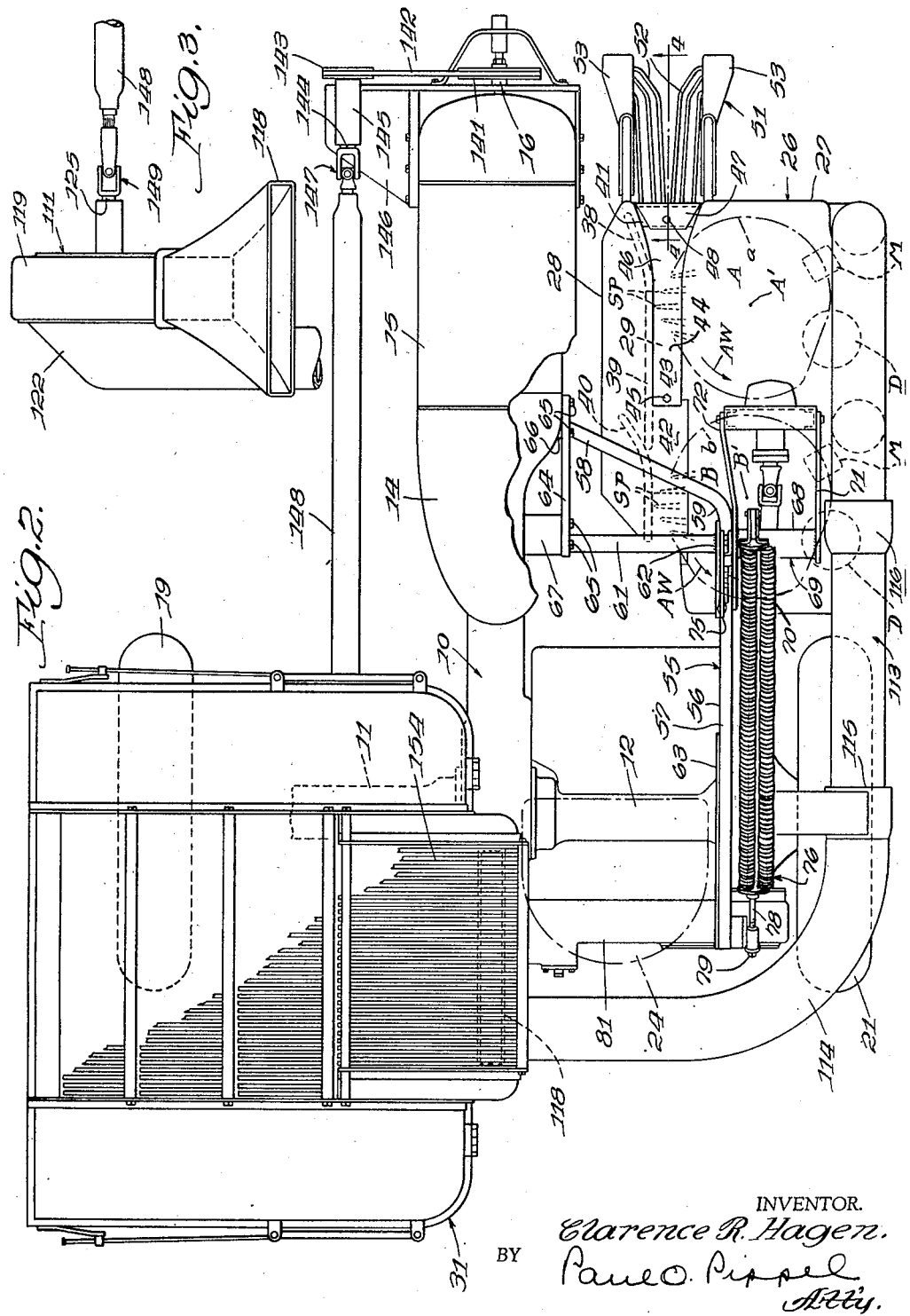
INVENTOR.
Clarence R. Hagen.
BY Paul O. Pippel
Atty.

Patented Sept. 5, 1950

2,520,927

UNITED STATES PATENT OFFICE 2,520,927

COTTON-PICKING APPARATUS

Clarence R. Hagen, Chicago, Ill., assignor to International Harvester Company, a corporation of New Jersey Application June 29, 1944, Serial No. 542,771

4 Claims. (Cl. 56—11)

This invention relates to cotton picking apparatus. More particularly, the invention concerns an improved cotton picking unit having an open top plant-receiving passage and a tractor on which said unit is mountable to place said passage in vision alinement for an operator at the tractor's operator station.

The bolls of cotton plants mature progressively in point of time throughout a picking season which is of sufficient duration for the plants to be picked several times. Those bolls upon the lower parts of the plants mature first so that in the initial picking of a field most of the uppermost bolls will be unopened. There is no need, therefore, at that time in subjecting the upper parts of the plants to successive picking treatment by picker finger groups arranged in tandem. An object of this invention is the provision in a cotton picking unit in which the plant receiving passage is open in at least part of its upper side whereby the tops of plants can project above the picker spindles to avoid treatment thereby.

A further object is the disposition of an open top picking unit, as in the preceding object, at a side of a tractor engine in fore and aft alinement with an operator's station so the operator can observe the plant row to better advantage through the uncovered plant passage. This enables the operator to easily see the stalks of plants within and somewhat ahead of the plant passage and thus more accurately steer the relatively narrow passage with respect to the plant row.

A further object is the provision of a cotton picking unit having a plant receiving passage, together with a plant deflecting cover plate detachably assembled over a portion of the passage for deflecting the tops of plants downwardly into the passage when desired.

An additional object is the provision of a cotton picking unit with picker assemblies arranged in tandem within a plant receiving passage of which at least that part of the passage opposite the front assembly is open at the top, and a plant deflecting cover detachably mounted upon the unit over said part of the passage.

The above and other desirable objects inherent in and encompassed by the invention will be better understood upon reading the ensuing description with reference to the annexed drawings, wherein:

Fig. 1 is a side elevational view of a tractor and cotton picking apparatus assembled according to and embodying a preferred form of the invention. The proximate rear wheel of the tractor being removed to expose parts of the apparatus;

Fig. 2 is a plan view of the tractor and apparatus shown in Fig. 1, there being a portion of the tractor fuel tank broken away;

Fig. 3 is a plan view of a cotton conveying blower employed in the apparatus and installed below the cotton receptacle as illustrated in Fig. 1; and Fig. 4 is a vertical sectional view taken through the plant passage of the picking unit as indicated by the line 4—4 in Fig. 2.

The Tractor

The tractor upon which the apparatus is herein assembled is one variety of farm tractor comprising a body 10 projecting forwardly from oppositely extending rear axle housings 11 and 12. At the front portion of the body 10 is the conventionally placed internal combustion engine 13, superposed by a fuel tank 14 and a hood 15. A shaft 16 at the front of the tractor is an extension of the engine crank shaft. Support for the front end of the tractor is provided by the usual steering truck 17 comprising a ground-engaging steering wheel 18. Support for the rear end of the tractor is provided by rear traction wheels 19 and 21 at the outer ends of the axle housings 11 and 12.

An operator's station includes an operator's seat 24 suitably supported adjacently to and over the axle housing 12—that is, to one side of the tractor body 10. The tractor steering wheel 25 is directly in front of the seat 24.

Cotton picking unit and support therefor

A cotton picking unit generally designated 26 is of the revolvable spindle type. This unit, which is disposed at the right of the tractor body, includes a casing 27 separated from a pressure plate assembly 28 by a plant receiving passage 29 which extends in virtual parallelism with the principal or longitudinal axis of the tractor and which passage is open at its opposite ends to facilitate movement of the unit lengthwise of the plant row. Two groups, A and B, or assemblies of cotton picking spindles are enclosed in the casing 27 in a tandem arrangement with the assembly A disposed forwardly of the assembly B. Cotton picking assemblies or instrumentalities A and B may each be of the character fully described in United States Patent 2,140,631, so it will suffice for the present disclosure merely to explain that the picker spindles SP of the assemblies A and B are revolved generally about vertical axes A' and B' (shown as points in Figure 2) to cause their tips to follow the paths indicated by the dot-dash lines $a$ and $b$. It will be seen, therefore, that picking instrumentality parts in the form of the picker spindles, while they are being revolved about the axes A' and B', are successively projected into and withdrawn from the plant receiving passage 29 through the side of the compartment forming one side of the plant receiving passage. Said side of the compartment serves as opening providing means in the respect of containing an opening or openings through which the spindles can project into the passage. While in the passage and while rotating about their individual axes, these spindles engage and cause the cotton of ripened bolls to be wound thereabout so that upon retraction of the spindles into the casing or crop receiving compartment 27, this cotton will be withdrawn from the bolls. There are several vertically spaced rows of the spindles SP so that the cotton plants disposed within the passage will be operated upon throughout the height of the passage.

The spindles SP revolve in the direction indicated by the arrows AW, and upon arriving in registry with a group of vertically spaced coaxial doffing disks of which the uppermost is shown in dotted outline at D, the cotton is removed from the spindles by these disks and discharged into the casing 27. Subsequently, the spindles come in registry with vertically aligned and spaced moistening disks of which the uppermost is shown in dotted outline at M and by means of which the spindles are moistened prior to again being projected into the plant receiving passage. The casing 27, in addition to housing the picking spindle sets, the doffer disks and the moistening disks, also serves as an air chamber of a pneumatic system for the conduction of the picked cotton away from the picker finger assemblies into a cotton receptacle 31. Air is drawn into the casing 27 through the openings at the plant passage where the picking fingers extend outwardly into said passage, and this air laden with the cotton doffed from the spindles, leads upwardly through conduit legs 32 and 33, Figure 1, for ultimate delivery into the receptacle 31. Doors 34 and 35 upon the outer side of the casing 27 pivot at their forward ends about axes which are coaxial with the lower ends of the conduit legs 32 and 33, and these doors have short conduit necks 36 and 37 pivotable within the conduit legs to facilitate opening and closing of the doors. Access is thereby easily had to the picker spindles, the doffing apparatus and the spindle moistening apparatus from the outer side of the picking unit 26.

That side of the plant receiving passage 29 opposite to the casing 27 is formed by plant pressing plates 38, 39, and 40 which are yieldably held into the positions illustrated so that they may be displaced toward the tractor engine when pressed upon by a profuse plant growth occupying the passage 29. The pressure plate assembly 28 is supported from the chamber 27 by a horizontal rod 41 at the upper forward end of the passage 29 and by a passage covering plate 42 at the rear end of the passage in registry with the rear picker spindle assembly B.

In Figs. 2 and 4, the front portion of the plant receiving passage 29 can be seen to be covered by a detachable covering plate 43 having a horizontal portion 44 secured at its rear end to the plate 42 by a cap screw 45, an upwardly inclined plant deflecting portion 46, and a rolled portion 47 at its forward end disposed about the rod 41 to which it is secured by a cap screw 48.

It is a characteristic of the cotton plant for the bolls adjacent to the ground to ripen first and for the bolls at the top of the plant to ripen or mature last. Since the bolls mature successively throughout a picking season of considerable duration, it is the practice with cotton picking machinery, as it has always been in hand picking, to pick the field several times during the picking season. When picking the crop for the first time, the bolls at the top of the plant will usually be sufficiently immature that it is unnecessary to cause the tops of the plants to be operated upon by both the front and back picker finger assemblies, and with this in view, the deflector plate 43 in vertical registry with the front assembly A, has been made easily detachable so that during this initial picking the tops of the plant may be allowed to project above the spindles of the front picking assembly. This avoids all likelihood of any injury to the unripened bolls by the front picking fingers. Such cotton that is ready for picking can be readily gathered by the rear finger assembly B.

A further advantage is gained by operating the machine with the passage cover plate 43 removed. This further advantage is gained partly by the fore and aft alinement of the operator's station 24 with the plant passage 29 so that an operator at the station 24 can see through the uncovered portion of the passage adapted to be closed by the plate 43 and thereby observe the stalks of the plants in the forward end of the passage as well as those about to enter the passage. This improved vision for the operator makes it much easier for him to properly steer the apparatus with respect to the plant row. The throat to the passage 29 is quite narrow, making accurate steering essential.

Later in the season when the plants have an abundance of mature bolls at their tops, the plate 43 can be reassembled with the picking unit so that the upper parts of the plants will be deflected thereby downwardly for operation upon by the front group of picking fingers as well as the rear group thereof.

A plant lifting device 51 is attached to the forward end of the unit 26 for raising the lowermost stems of the plants off of the ground to a sufficient height for passing through the lower ones of the picking spindles SP. The device 51 comprises backwardly inclined rods 52 having ground-engaging runners 53 attached to their front ends.

Support for the picking unit 26 is provided by a frame 55 comprising a generally L-shaped frame member 56 having a fore and aft extending leg 57 and a laterally turned leg 58 having a juncture 59. A strut member 61 connects with the frame member 55 adjacently to the juncture 59 where the member 61 extends through an aperture (not shown) in the leg 57 of the frame member 56. A welded connection 62 is provided between the members 61 and 56. The rear part of the leg 57 is supported upon the tractor axle housing 12 by a plate 63 to which the member 57 is secured by any standard means 63' in figure 1. A footing plate 64 is welded or otherwise secured to the free ends of the members 58 and 61, and this plate 64 is adapted to be secured to the tracter body 10 by means of cap screws 65 which are screwed into bosses or pads 66 and 67 provided upon said body 10.

The outer end of the strut 61 extending through the frame leg 57 extends into and provides a bearing spindle for the hub 68 of a bell-crank 69, which has a pair of laterally spaced horizontal arms 71 and 72 and an upright arm 73. The forward ends of the arms 71 and 72 mutually support the upper end of a linkage 74 which is attached to the picking unit by capscrews 74'. By pivoting the bell-crank 69, the outer end of the arms 71 and 72 can be raised or lowered for changing the elevation of the picking unit which is suspended therefrom through the link 74.

Pivoting of the bell-crank 69 is effected manually through a lever 75 having its lower end attached to the hub of the bell-crank and operable over a quadrant 70, Fig. 2, for retaining a selected height of the picking unit. The upwardly projecting arm of the bell-crank is operated upon by the counter-balancing spring assembly 76, which is adjustably connected to a bracket 77 on the back end of the frame leg 57 by a threaded rod 78 and a nut 79. Since the counter-balancing spring 76 is connected to the frame 55 through the bracket 77 and the bell-crank 69, which may be retained in a selected pivoted relation by the engagement of the lever 75 with the quadrant 70 irrespective of whether the picking unit 26 is supported upon the forwardly projecting arms of the bell-crank, said counter-balancing spring can be assembled and disassembled from the tractor with the frame while the forwardly projecting arms of the bell-crank remain in a lowered or horizontal position which facilitates attachment and detachment of the picking unit.

Driving force is transmitted to the picking unit 26 through chains (not shown) in a transverse casing 81 disposed rearwardly of the axle housing 12. These chains are drivingly connected with a shaft 89, Fig. 1, which, through a universal joint 95, a shaft 96, a universal joint 97, and gearing (not shown) within a casing 98, is drivingly connected with the spindle assemblies A and B.

Cotton doffed from the doffers D into the casing or suction chamber 27 is carried upwardly through the conduit legs 32 and 33 by air caused to flow into the chamber 27 at the passage openings through which spindles SP project by means of a rotary blower 111, Figs. 1 and 3. This blower is connected with the conduit legs 32 and 33 through an articulated conduit 113 having a joint 116 and a curved conduit 114 having a connection with the rear end of the conduit 113 at a flexible joint 115. The cotton and air entering a vestibule 122 of the blower are induced into a cylindrical part of the blower having a cylindrical wall 119 from which the cotton and air are discharged upwardly through a spout 118. From the upper end of the spout, the cotton and air are discharged against the under side of a grillework 154 which deflects cotton into the receptacle 31 while permitting discharge of the air together with undesired foreign particles, such as small plant stems and leaves, picked with the cotton.

The blower rotor (not shown) is arranged coaxially with a drive shaft 125 therefor, Fig. 3. Said shaft 125 and the rotor are driven at all times the engine is running, through a driving train consisting of a universal joint 149, Fig. 3, a shaft 148, Figs. 2 and 3, a universal joint 147, a short shaft 144 journaled in a bearing 145 of bracket 146, a pulley 143 on the shaft 144, and a belt 142 extending about said pulley and a driving pulley 141 constrained for rotation with the crank-shaft extension 16.

Having thus described the invention together with an illustrative environment therefor, I claim:

1. A cotton picking unit having a plant receiving passage open at opposite front and rear ends, and comprising a plant pressing plate at one side of the passage, a covered crop receiving compartment at the opposite side of said passage, a picking instrumentality having parts movable to and from a section of said passage for transferring cotton from plants therein into said compartment, said passage being open at its top over said passage section, and a downwardly and rearwardly extending plant deflecting member detachably mounted over the passage to close the portion thereof over said passage section for deflecting the tops of tall plants downwardly thereinto.

2. A cotton picking unit having a plant receiving passage with open front and back ends and comprising covered compartment means alongside of the passage, said compartment means including opening providing means alongside of the passage and communicating therewith, picking instrumentality assemblies in the compartment means and spaced lengthwise of said passage and projecting thereinto through said opening for performing successive picking operations upon plants directed through the passage, said passage being open over at least the assembly nearest its front end to facilitate vision of plants in and forwardly of said passage, and a plant deflector member removably disposed over said top open portion of the passage to deflect the tops of tall mature plants downwardly into the passage for subjection to the front picking assembly.

3. A cotton picking unit having a plant receiving passage with open front and back ends and comprising covered compartment means alongside of the passage, said compartment means including opening providing means alongside of the passage and communicating therewith, picking instrumentality assemblies in the compartment means and spaced lengthwise of said passage and projecting thereinto through said opening means for performing successive picking operations upon plants directed through the passage, said passage being closed at its top over the assembly nearest its back end to deflect the tops of tall plants downwardly accessibly to the rear assembly, and said passage being open at its top over the assembly nearest its front end to facilitate vision of the plants in and forwardly of the front portion of said passage and to facilitate passage of the less mature first picking upper bolls of tall plants over the front assembly without subjection to treatment thereby.

4. The combination set forth in claim 3, wherein there is a plant deflector member removably disposed in the top portion of the passage over the front assembly for service in fields where the crop is mature at the top of the plants, to deflect the tops of said plants downwardly so they are successively subjected to the operation of the picking assemblies.

CLARENCE R. HAGEN.

REFERENCES CITED

The following references are of record in the file of this patent:

UNITED STATES PATENTS

| Number | Name | Date |
|---|---|---|
| 776,467 | Hoskins | Nov. 29, 1904 |
| 1,755,507 | Janacek | Apr. 22, 1930 |
| 1,894,198 | Rust et al. | Jan. 10, 1933 |
| 2,011,924 | Benjamin | Aug. 20, 1935 |
| 2,076,598 | Rust et al. | Apr. 13, 1937 |
| 2,140,631 | Johnston | Dec. 20, 1938 |
| 2,352,291 | Scarratt et al. | June 27, 1944 |
| 2,358,513 | Hyman | Sept. 19, 1944 |